G. W. DE WITT.
AUTOMOBILE.
APPLICATION FILED JULY 26, 1913.
1,091,735.
Patented Mar. 31, 1914.
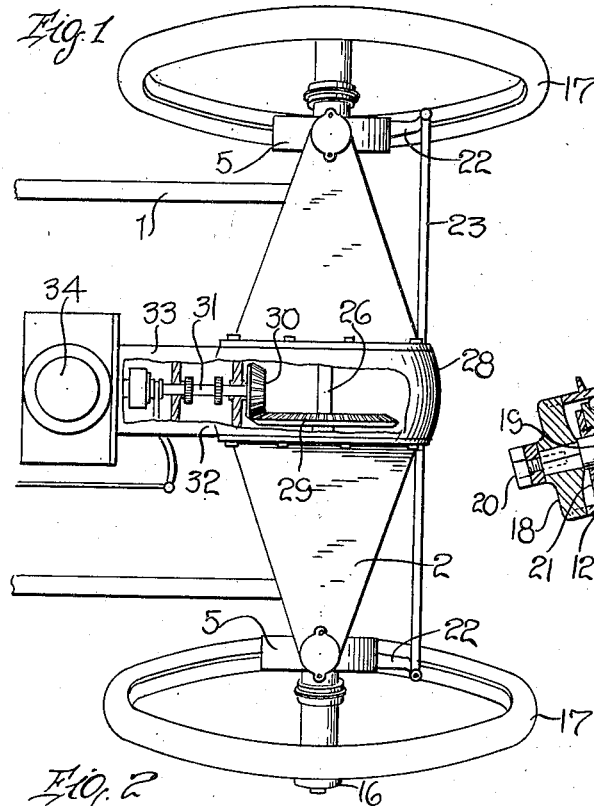
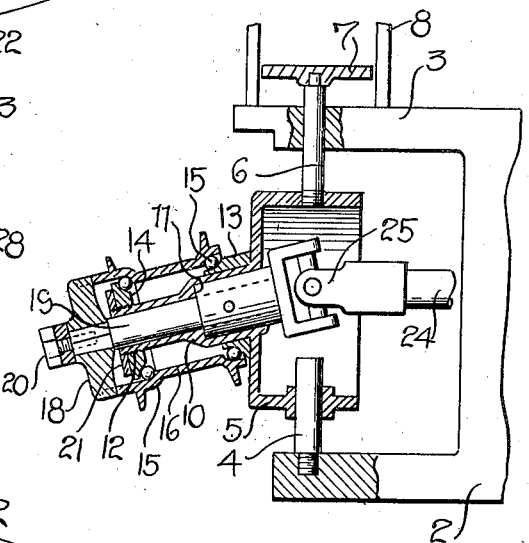
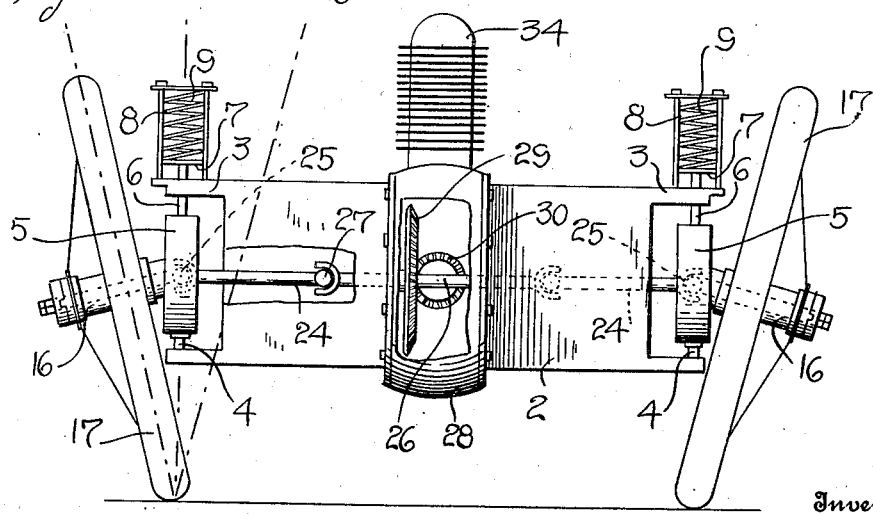
Witnesses
Robert M. Sutphen.
A. L. Hind.
Inventor
G. W. DE WITT
By Watson E. Coleman
Attorney

UNITED STATES PATENT OFFICE.

GEORGE W. DE WITT, OF HOUSTON, TEXAS.

AUTOMOBILE.

1,091,735.

Specification of Letters Patent. Patented Mar. 31, 1914.

Application filed July 26, 1913. Serial No. 781,424.

*To all whom it may concern:*

Be it known that I, GEORGE W. DE WITT, a citizen of the United States, residing at Houston, in the county of Harris and State of Texas, have invented certain new and useful Improvements in Automobiles, of which the following is a specification, reference being had to the accompanying drawings.

This invention relates to new and useful improvements in automobiles and more particularly to a means for distributing the power therein, and the primary object of the invention resides in providing means for distributing the propelling power to the fore wheels of the vehicle and at the same time provide for the steering of the vehicle through the movement of the same wheels.

A further object of the invention resides in providing an improved steering knuckle and hub in connection with the fore wheels of a vehicle and a still further object resides in providing a construction wherein the differential or compensating gearing is eliminated.

A still further object of the invention resides in providing a construction in which the motor, clutch case, transmission case and ring gear or differential gear case is a unit.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a fragmentary plan view of a vehicle with my improvements applied to use thereon, disclosing parts in section. Fig. 2 is a front elevation thereof with parts broken away. Fig. 3 is an enlarged vertical section through the hub and spring knuckle construction.

In describing my invention, I shall refer to the drawing in which similar reference characters designate corresponding parts throughout the several views and in which 1 indicates a main frame of a vehicle, the forward ends of which are suitably mounted in connection with a casing 2, which is tapered smaller toward its ends and designed to provide the steering knuckles 3, at the said ends.

Threaded into the lower arm of each of the steering knuckles 3, is a vertical stub shaft or pin 4, upon which is slidably mounted a drum-like casing or housing 5, the latter being arranged in a vertical position and having threaded in the periphery thereof, at a point diametrically opposite the pin or stub shaft 4, an additional pin or stub shaft 6. This latter pin or stub shaft is slidably disposed through an opening in the upper arm of the steering knuckle and the outer end of this member 6 has a head 7 formed thereon which is slidably guided in a frame 8 mounted on the top of the upper arm of the steering knuckle. A strong coil spring 9 is mounted in this frame and presses downwardly upon the head 7. The purpose of this coil spring will be hereinafter and more particularly set forth.

Each of the drum-like casings or housings 5 has a downwardly inclined tubular extension 10 formed about centrally thereon, the bore of which is reduced to provide a shoulder 11 and the outer free end of this tubular extension 10 is threaded, as shown at 12. Mounted on the inner and outer portions, respectively, of the tubular extension 10, are the cones 13 and 14, which are arranged thereon according to the downward inclination of said tubular portion and the inner opposed edges of said cones are provided with race-ways to receive the bearing balls 15 therein. A hub 16 of a wheel 17 is designed to rest upon the bearing balls 15 and a cap 18 which is applied to the outer end of the hub 16 receives therethrough the squared portion of a shaft section 19, the latter being snugly fitted and rotatably mounted in the tubular extension 10 of the casing or housing 5. The extreme outer end of the shaft section 19 on the squared portion thereof, has a nut 20 applied thereto, which, when turned home, secures the cap 18 in position to admit of the rotation of the wheel upon the rotation of the shaft 19. A lock nut 21 is applied to the threaded portion 12 of the tubular extension 10 to lock the cone 14 in place and simultaneously lock the hub 16 in place. It will be seen from this construction that the plane of the wheel 17 is angular to the vertical plane of the pivot pins 4 and 6 and said planes converge at the point of contact of the wheel with the ground. Formed on each of the housings or casings 5, is a forwardly extending arm or projection 22 which has connected thereto, one end of a connecting rod 23. The wheels, through this medium, may be operated together.

The inner end of the shaft section 19 has connection with an additional shaft section 24, through the medium of a universal knuckle 25 and a further shaft section 26 has connection with the opposite end of the shaft section 24, through an additional universal knuckle 27. The shaft section 26 extends through the gear casing 28 which is formed as a part of the casing 2 and has an enlarged bevel gear 29 mounted thereon. This bevel gear meshes with a pinion 30 carried on the forward end of a longitudinally extending shaft 31 which is arranged in the transmission case 32. This latter case is formed integral with the gear case and is also formed integral with the clutch case 33. This latter case is also integral with the crank case of the motor 34. It will be seen from this construction that the gear case, transmission case, clutch case and motor are of unit construction, thus providing a construction which is simple, durable and inexpensive.

Any desired form of steering mechanism may be provided for this device and it will be seen that while the propelling power is applied to the fore wheels of the device, the same may, at the same time, be readily turned in either direction, particularly in view of the inclination of the planes of the wheels with respect to the planes of the pivot points therefor. In considering the construction and operation of the device, it will be well to consider an imaginary cone as shown in dotted lines in the drawing, the side of which is formed by the plane of a wheel. An imaginary line drawn through the pivot pins 4 and 6 will converge with the plane of the wheel at the point of contact with the ground and thereby form the center of the imaginary cone and the top of the wheel in its various movements through the guiding thereof will strike a circle around the base of the cone which, in this case, would be inverted. It is this construction, as so considered, that permits the differential or compensating gearing to be eliminated and, at the same time, affords safety in the operation of the vehicle having this construction applied. While the fore wheels may be rotated at a great rate of speed, it will be understood that the same may be readily turned in either direction to guide the vehicle and when said wheels meet obstructions in the path thereof, the same may readily yield in view of the connection between the same and the coil springs 19, as above described.

Such a construction as above described and shown in the drawings, permits easy steering and causes the front wheels to constantly assume a straight line. The wheels turn quite readily, however, and after rounding a curve, assume a straight line with little turning of the steering wheel. These advantages are all afforded through the particular construction above described and shown in the drawing.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

In a vehicle, the combination with a casing having a knuckle formed at the end thereof; of a drum-like housing arranged between the arms of said knuckle and provided with openings in the periphery at diametrically opposite points thereon, the one opening being threaded, a stub shaft removably engaged with one arm of said knuckle and loosely disposed through the unthreaded opening of said drum-like housing, an additional stub shaft threaded into engagement with the threaded opening of said housing and loosely disposed through the opposite arm of said casing, a head piece mounted on the outer end of the last mentioned stub shaft, a guide frame mounted on the arm of said knuckle, through which said last mentioned stub shaft is disposed, spring means arranged in the guide frame in contact with said head piece to yieldingly support the drum-like housing in said knuckle, and means for rotatably supporting a wheel on said drum-like housing.

In testimony whereof I hereunto affix my signature in the presence of two witnesses.

GEORGE W. DE WITT.

Witnesses:
J. W. KENNEDY,
RAYMOND PEARSON.